(12) United States Patent
Sloo et al.

(10) Patent No.: US 8,190,683 B2
(45) Date of Patent: May 29, 2012

(54) SYNCHRONIZING MULTIPLE USER REMOTE CONTENT PLAYBACK

(75) Inventors: David Sloo, Menlo Park, CA (US); Michael Darnell, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 12/040,477

(22) Filed: Feb. 29, 2008

(65) Prior Publication Data
US 2009/0222520 A1    Sep. 3, 2009

(51) Int. Cl.
*G06F 15/16* (2006.01)
(52) U.S. Cl. .................. 709/205; 709/204; 709/206
(58) Field of Classification Search .................. 709/205, 709/204, 206
See application file for complete search history.

(56) References Cited

U.S. PATENT DOCUMENTS
2006/0161621 A1    7/2006 Rosenberg
2006/0236352 A1    10/2006 Scott, III
2006/0271997 A1    11/2006 Jacoby et al.
2007/0250761 A1    10/2007 Bradley et al.
2007/0271338 A1    11/2007 Anschutz

FOREIGN PATENT DOCUMENTS
WO        2006137762 A1    12/2006

OTHER PUBLICATIONS

Yiming Liu et al., Zync: the design of synchronized video sharing, Copyright 2007 AIGA, 8 pages, http://yahooresearchberkeley.com/blog/wp-content/uploads/2007/10/liu_ztdosvs_sketch-web.pdf.
Kundan Singh et al., Comprehensive Multi-platform Collaboration, Columbia University, New York, NY, USA, http://www1.cs.columbia.edu/~xiaotaow/rer/Research/Paper/collaboration.pdf.

*Primary Examiner* — Jeffrey Pwu
*Assistant Examiner* — Shripal Khajuria
(74) *Attorney, Agent, or Firm* — Vierra Magen Marcus & DeNiro LLP

(57) ABSTRACT

Playback of content downloaded or streamed from a network service is automatically synchronized for users at different client devices. Synchronization is achieved using user approved actions to perform during content playback. Each client device submits playback status to a server while the server generates and sends synchronization instructions for each client device. The synchronization instructions are based on user parameters and the difference in playback position between the users.

15 Claims, 12 Drawing Sheets

SYNCHRONIZING MULTIPLE USER REMOTE CONTENT PLAYBACK

BACKGROUND

Television sets can receive video that is broadcast over airwaves or through cable and provide the video according to a set schedule. Users in the same city, state or time zone can watch content on a particular channel at the same time. If a user tunes into a television channel later than another, the later user may view the program already in progress at the same point in time as other viewers that have watched the video program from an earlier time.

With development of the Internet, people may view video content at different times from downloaded video files, using video-on-demand services or streaming video content. In particular, a user may access a network service, select content to be retrieved, download or stream the content and view it whenever the user wishes. Though downloading or streaming content to view at any time may be convenient for a particular user, it is difficult to coordinate simultaneous viewings by different users at different locations using these methods.

SUMMARY

The technology described herein pertains to automatically synchronizing playback of content downloaded or streamed from a network service for users at different client locations. A user may choose to synchronize playback of the content with any number of contacts also viewing that particular content. Content synchronization is achieved by executing user approved instructions on a playback mechanism during content playback. The synchronization instructions are determined based on a content playback position for each user and contact within a viewing group for which the content is synchronized.

Instructions which are executed to manipulate content playback may include viewing the content at a faster speed or slower speed, deleting or summarizing a portion of the content and other actions. Synchronization using the instructions is achieved based a user request to synchronize with another user or a second user's request to synchronize the with the first user's playback. To determine which instructions to apply to playback of the content, each client may provide updates to the server indicating the content being played, the playback position at the client, and other data. The server determines the relative playback positions at each client and which of a series of actions to perform during playback to synchronize the content. Instructions are then generated and sent to each client by the server.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

The present technology automatically synchronizes playback of content downloaded or being streamed from a network service for users at different client locations. The synchronization occurs whether content playback is started at the same time or a different time by different users. Upon selecting content to view, a user may choose to synchronize playback of the content with any number of contacts also viewing that particular content. A user may also configure what actions may be performed during playback to synchronize the content. To synchronize content playback between two or more client devices, playback updates are transmitted by clients playing content to a synchronizing server. The synchronization server receives the updates and provides each client with synchronization instructions to execute during content playback.

A user playing content through a client device may configure what actions may be performed during playback of content on the client. Examples of these actions may include viewing the content at a faster speed or slower speed, deleting or summarizing a portion of the content and other actions. In addition, a user may configure whether the actions may be taken per a user request to synchronize with another user or based on a second user's request to synch the with the first user's playback.

Synchronization is automatically achieved through communication between a server and two or more client devices through which the content is being played. Each client may provide updates to the server indicating the content being played, the playback position at the client, and other data. The server determines the relative playback positions at each client and which of a series of actions, if any, may be performed during playback at each client to synchronize the content. Synchronization instructions are then generated and sent to each client by the server.

Figure 1:
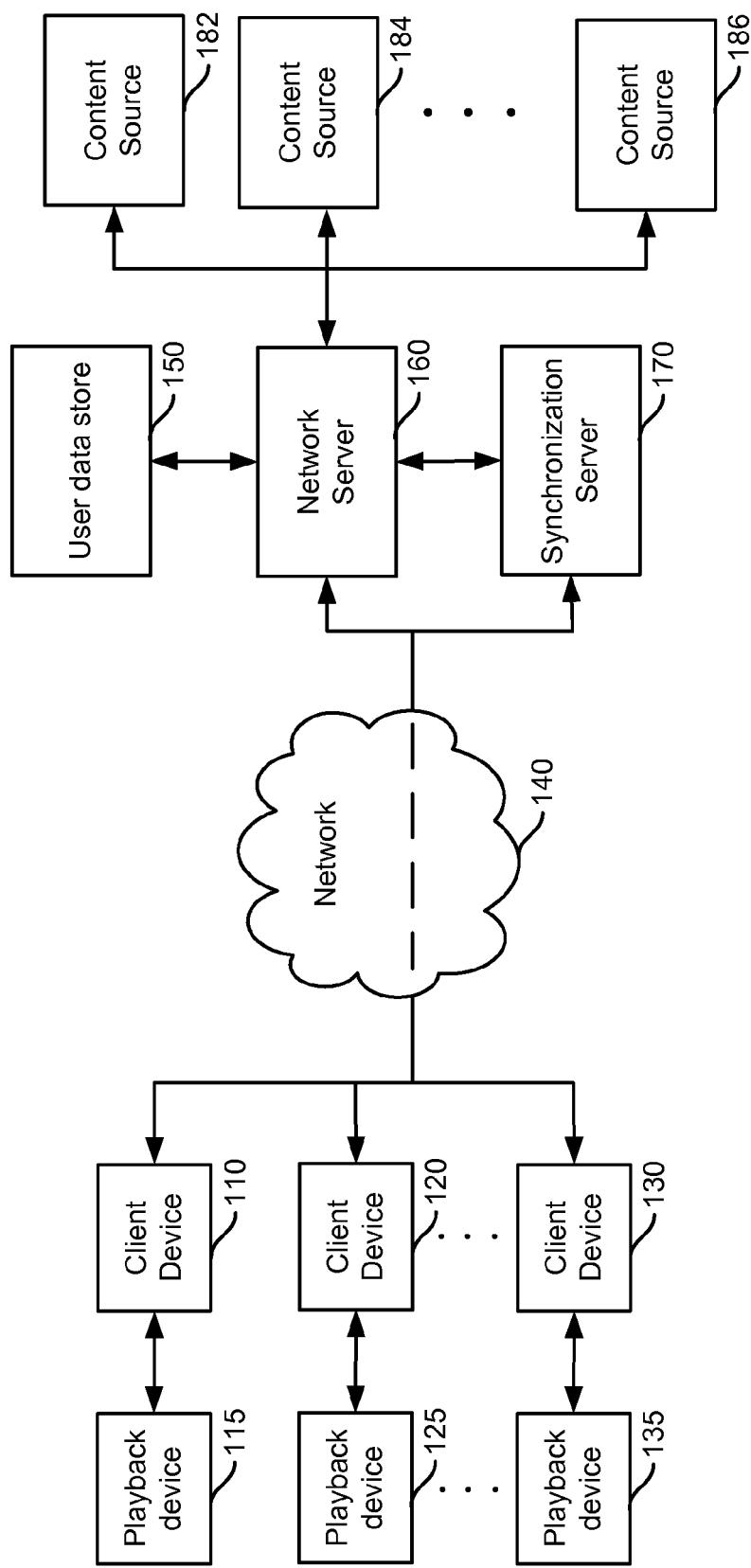
FIG. 1 is a block diagram of an embodiment of a system for synchronizing content playback.

FIG. 1 is a block diagram of an embodiment of a system for synchronizing content playback. The system of FIG. 1 includes Playback devices 115, 125 and 135, client devices 110, 120 and 130, network 140, user data store 150, network server 160, synchronization server 170, and content sources 182, 184 and 186.

Client devices 110-130 communicate with Playback devices 115-135, respectively. Each of Playback devices 115-135 may be implemented as a television, monitor, audio system, or some other device for playback of video, audio or other digital content. Each client device may receive digital content data, messages, instructions and other data from network server 160 and/or synchronization server 170 over network 140 and provide data in graphical, video, audio or some other digital media format to playback device 115. Each of client devices 110-130 may be a set top box, computer or gaming console. In some embodiments, each client device may be implemented as a gaming console such as "Xbox 360", by Microsoft Corporation of Redmond, Wash.

Network 140 may be implemented as a WAN, LAN, public network, private network, Internet, Intranet, a combination of these or some other network or networks. In some embodiments, network 140 could be implemented as a broadband network, satellite broadcast communication network, a cell phone network or some other data communication network.

Network server 160 provides a media synchronization service over network 140 to any of client devices 110-130 or other machines. The synchronization service provides one or more user interfaces to client devices to perform login, configure user contacts, download content and configure synchronization preferences, automatically synchronize playback of content and perform other tasks and operations. Network server 160 may also receive data from clients, such as for example parameters used to synchronize digital content playback, and other data.

Figure 2A:
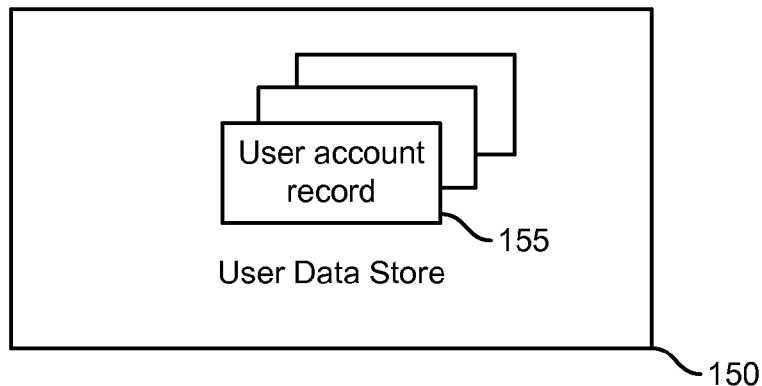
FIG. 2A is a block diagram of a user data store.
Figure 2B:
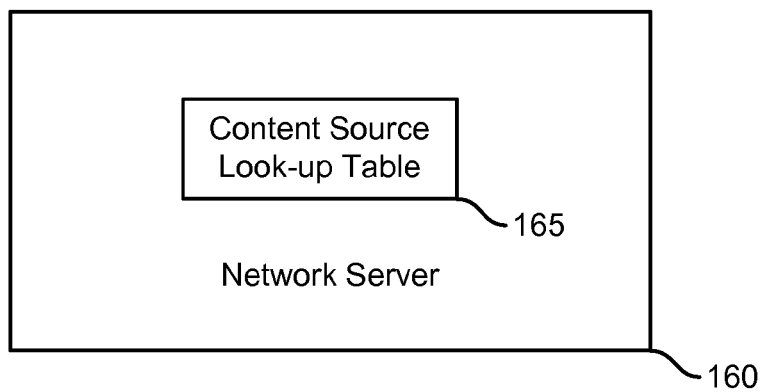
FIG. 2B is a block diagram of a network server.

When providing content to be played at a client device, the network server may retrieve the content from one of content sources 182-186. To determine what content is located at which content source, network server 160 may include one or more content source lookup tables 165 as illustrated in FIG. 2B. Content source lookup table 165 includes content available for download or streaming by a client device and a corresponding location where the content is stored, such as a particular content source machine. When a user selects content to be played back, network server 160 determines the location of the content source machine for the requested content and retrieves the content from the content source.

User data store 150 may be implemented as a database, a server, or some other machine for storing data and communicates with network server 160. The stored data may be associated with user account data, content data and other data. For example, user data store 150 may include one or more user account records 155 as illustrated in FIG. 2A. Each user account record may include user login data, contact information, synchronization preferences, contacts associated with each user account, and other data.

Synchronization server 170 may communicate with network server 160 and one or more client devices 110-130 and manages synchronization between two or more clients viewing digital content. Managing synchronization involves receiving synchronization parameters from network server 160, receiving updates from clients playing content, determining synchronization that needs to be performed at each client and sending synchronization instructions and/or messages to each of the client devices currently playing the content.

Figure 2C:
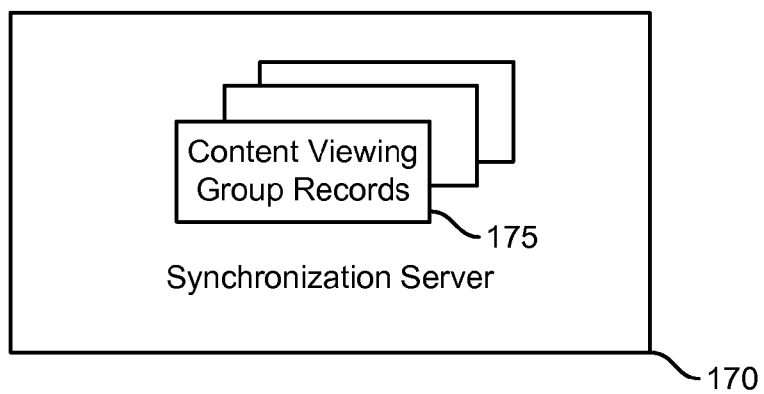
FIG. 2C is a block diagram of a synchronization server.

When managing synchronization, a group of users or contacts may be grouped into a viewing group. Synchronization server 170 maintains a list of content viewing group records 175 as illustrated in FIG. 2C. Each content viewing group record lists a number of contacts which are watching a particular element of digital content and synchronizing their playback of the content. In some embodiments, network server 160 and synchronization server 170 may be implemented as the same server or two or more servers.

Content sources 182-186 contain content that may be downloaded or streamed to and played by one of client devices 110-130. Each of content sources 182-186 may be accessed by network server 160 and may contain digital content such as video, audio, movies, television episodes, sporting events, news, weather, music videos, songs, podcasts and other content.

Automatic synchronization as performed by the system of FIG. 1 is discussed below with respect to the system machines. In particular, operation of network server 160 is discussed with reference to FIGS. 3-5, operation of synchronization server 170 is discussed with respect to FIGS. 6-7, and operation of a client device is discussed below with respect to FIGS. 8-10.

Figure 3:
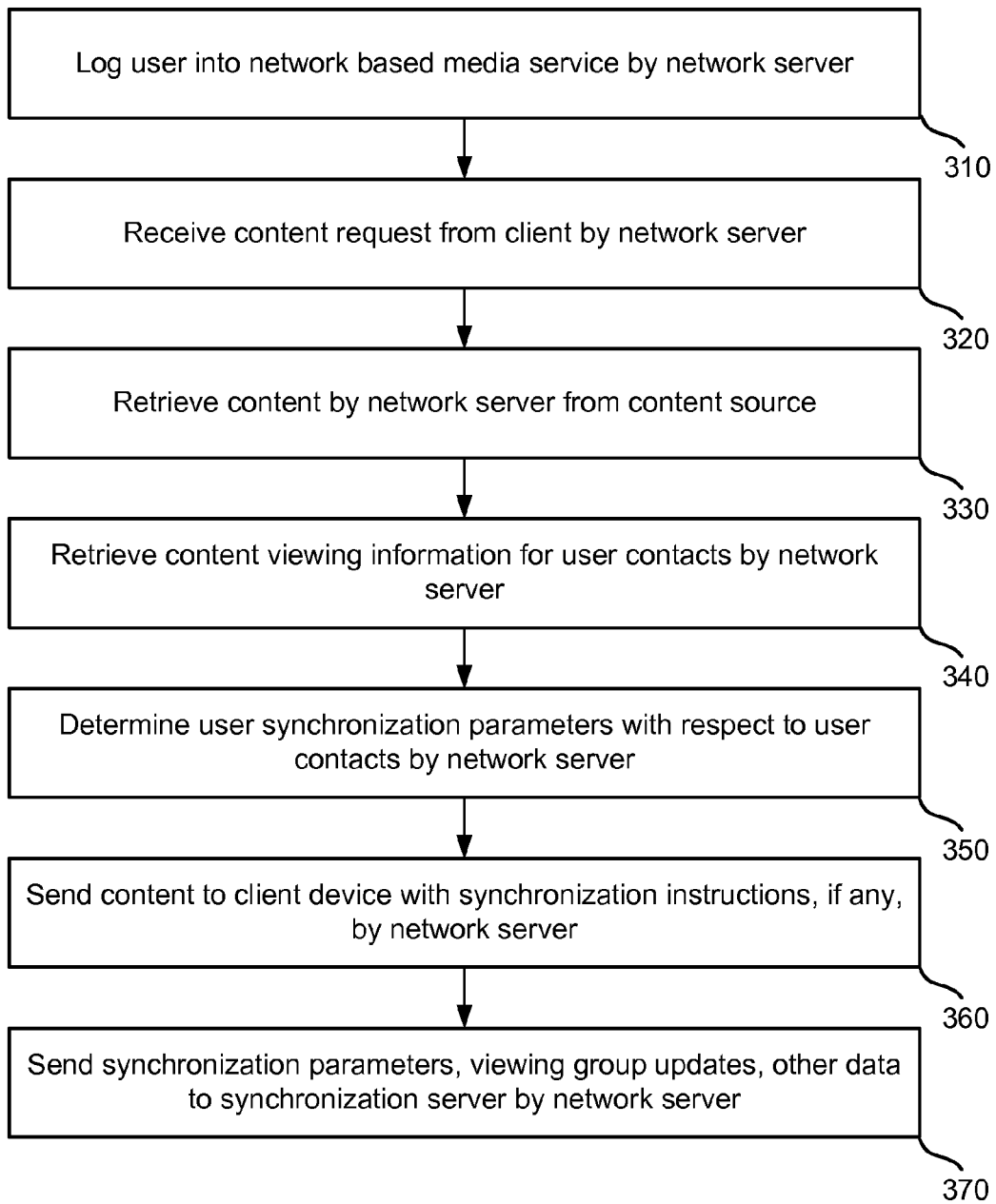
FIG. 3 is a flowchart of an embodiment of a method for operation of a network server during a synchronization process.

FIG. 3 is a flowchart of an embodiment of a method for operation of network server 160 during a synchronization process. The method of FIG. 3 will be discussed with respect to communication between server 160 and client device 110, though it is performed for each client involved in synchronized playback and any client device could be used. First, network server 160 logs a user into a network based media service at step 310. The media service accesses digital content for a user and automatically synchronizes playback of the content. Performing login with one or more user contacts that are currently playing the content may involve receiving a connection request from client device 110 and user name and password information, or other log in data, from the client. Upon receiving the log in information, network server 160 accesses a client account record associated with the user, confirms the user information matches the received log in information, and sends a corresponding message to client 110. If the log in information received from client 110 matches the log in information in the user's account, network server 160 logs in the user and provides a network service user interface to the client device 110.

A content request may then be received from client 110 by network server 160 at step 320. Requests may be received in several ways known in the art, such as for example in a SOAP message, or some other message format. The request will contain an identification of the client device making the request and the content requested. After receiving a content request, network server 160 may retrieve the content from a content source at step 330. Retrieving the content may include looking up the location of the content using content source lookup table 165 and requesting the content from the corresponding content source. The corresponding content source receives the request, retrieves the content and sends the retrieved content to network server 160.

After retrieving the content, content viewing information for user contacts may be retrieved by network server 160 at step 340. The content viewing information identifies user contacts currently viewing the same content requested by the user. To retrieve content viewing information, network server 160 accesses the set of contacts for the user from user data store 150, determines the content viewed by any of the user contacts, and then determines whether the viewed content matches the user requested content. Retrieving content viewing information is discussed in more detail below with respect to FIG. 4.

User synchronization parameters are determined with respect to user contacts by network server 160 at step 350. Determining user synchronization parameters is achieved by providing the contact viewing information to the client, receiving the synchronization parameters in a response from the client, and sending the data to synchronization server 170.

Determining user synchronization parameters is discussed in more detail below with respect to the method of FIG. 5.

After determining user synchronization parameters, the requested content is sent to client 110 with any synchronization instructions by network server 160 at step 360. The content sent is that requested at step 320. Initial instructions may include instructions to slightly increase the playback speed of the content, an instruction to contact synchronization server 170, or some other instruction. For example, the synchronization instructions may include the address or location of synchronization server 170 so client device 110 may have playback synchronized by server 170. After content and synchronization instructions are sent to client 110, synchronization parameters, viewing group updates and other data is sent to synchronization server 170 by network server 370. The synchronization parameters include user identification, content identification actions allowed to achieve synchronization, and other data.

Figure 4:
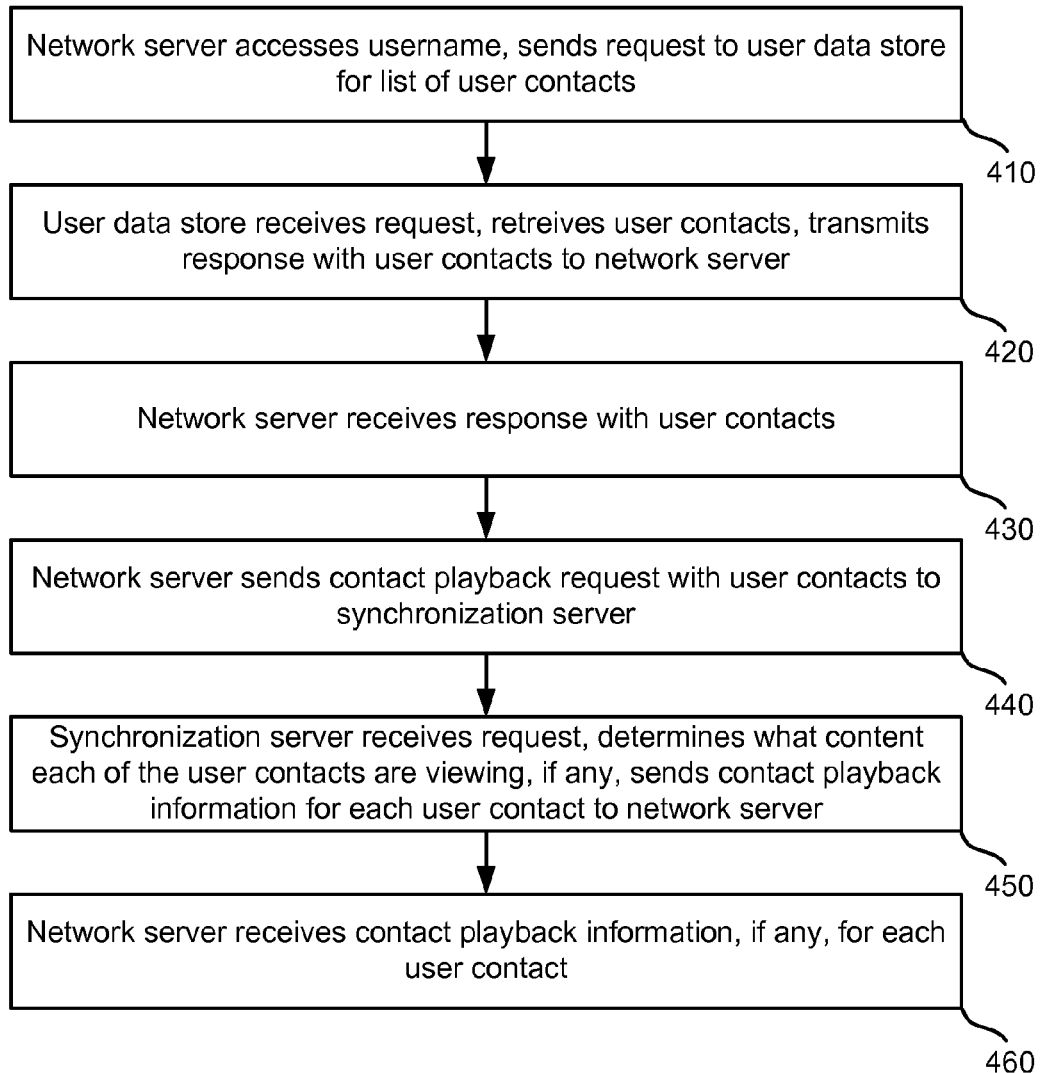
FIG. 4 is a flowchart of an embodiment of a method for retrieving content playback information for user contacts by a network server.

FIG. 4 is a flowchart of an embodiment of a method for retrieving content viewing information for user contacts by network server 160. In some embodiments, the method of FIG. 4 provides more detail for step 340 in the method of FIG. 3. First, network server 160 accesses the user name or other user identifier and sends a request to user data store 150 for a list of user contacts for the user at step 410. The user name or identifier may be retrieved from the login information received from client device 110. The request may to user data store 150 may indicate a user identifier, a query for the users contacts, and other data. The contacts may be added to a user account at some other time and are discussed in more detail below at step 820 in the method of FIG. 8.

User data store 150 receives the request, retrieves the user contacts and transmits a response with the user contacts to network server 160 at step 420. User data store 150 retrieves the contact data from a stored record corresponding to the user identified in the request. In some embodiments, user data store 150 may contain login data for a user to be used with a user electronic mail account, gaming account, and other accounts. Thus, the login data may be used to implement access several accounts. The response includes contact identification information for each contact associated with the identified user.

Network server 160 receives a response with the user contacts at step 430 and sends a contact playback request to synchronization server 170 at step 440. The contact playback request is to determine which user contacts are logged in and what content, if any, each contact is viewing. If any logged in user contacts are viewing the same content requested by the user at the client device, network server 160 indicates this to client device 110 and provides the user an opportunity to synchronize his or her content playback with user contacts currently playing the same content.

Synchronization server 170 receives the request from network server 160, determines what content each of the user contacts are viewing, if any, and transmits the content playback information for each contact to network server 160 at step 450. In some embodiments, synchronization server 170 maintains viewing groups for each element of content and a group of contacts synchronizing playback of that content. Each user is in only one viewing group and only one content element may be associated with a group. A network server then receives the contact playback information from synchronization server 170 at step 460.

Figure 5:
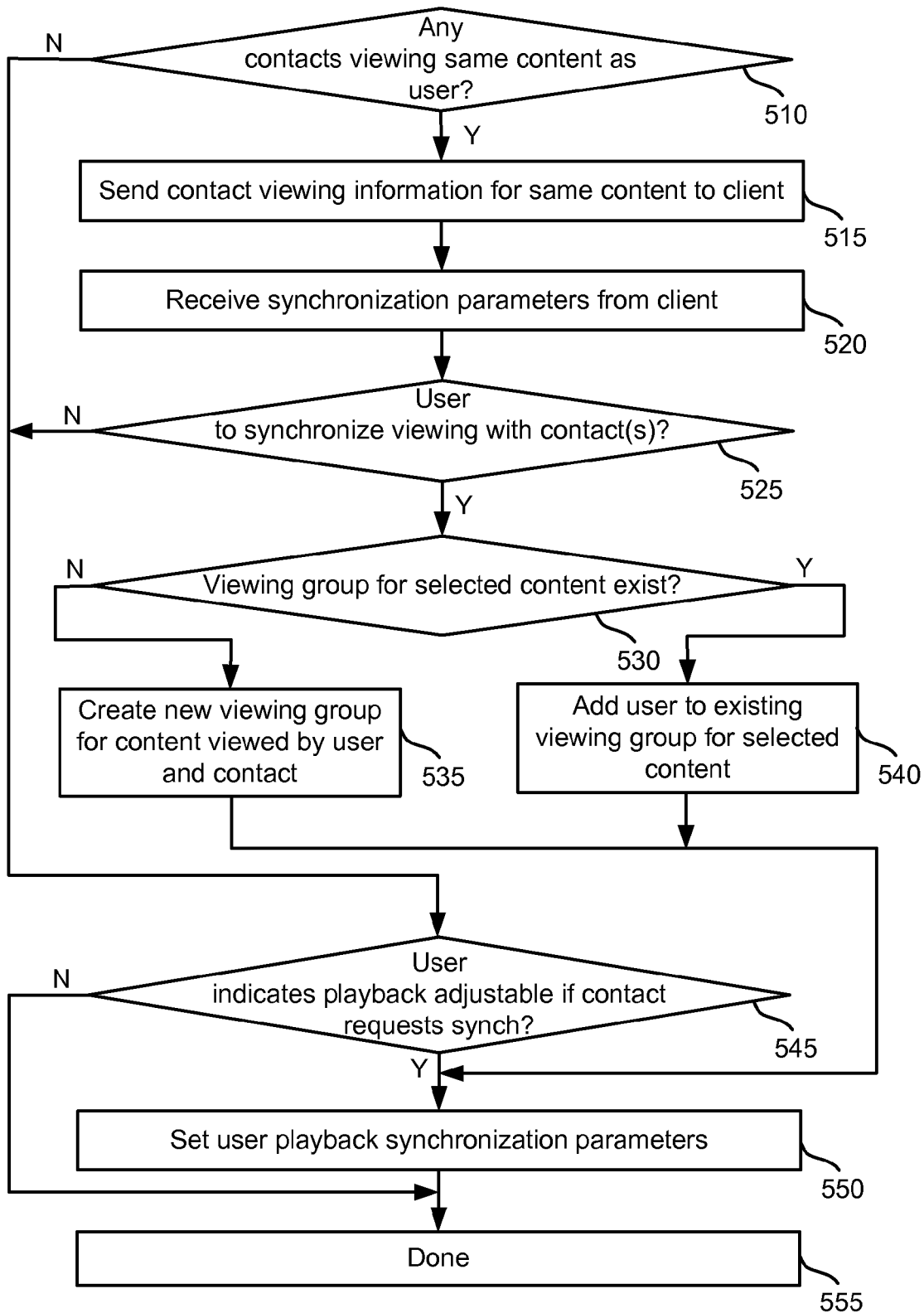
FIG. 5 is a flowchart of an embodiment to a method for determining user playback synchronization parameters by a network server.

FIG. 5 is a flowchart of an embodiment of a method for determining playback synchronization parameters by network server 160. In some embodiments, the method of FIG. 5 provides more details for step 350 of the method of FIG. 3.

First, a determination is made as to whether any user contacts are viewing the same content requested by the user at step 510. Network server 160 may make this determination by comparing the content request received from client device 110 to the contact playback information received from synchronization server 170 at step 370. If no contacts are viewing the same content the user requested, a determination is made as to whether the user has indicated that playback may be adjusted if a contact of the user requests synchronization at step 545. In some instances, although no user contacts may currently be playing the content requested by the user, one or more user contacts may later initiate playback of the content and wish to synchronize their playback with the user's playback. The user may indicate this preference when configuring a user account, during playback of the content, or in some other way. If the user indicates that its own playback of the content may be adjusted to synchronize with a user contact upon the contacts request, the user playback synchronization parameters are set accordingly at step 550. User playback synchronization parameters may be set based on the parameters received at step 520. The method of FIG. 5 then ends at step 555. If the user does not indicate that playback can be adjusted based on a contact request to synchronize, the method of FIG. 5 ends at step 555.

If one or more contacts are viewing same content requested by the user, contact playback information associated with the contacts is sent to requesting client device 110 at step 515. The data sent to the client allows the user to choose whether to synchronize playback with one or more contacts. The contact viewing information may be provided in a user interface sent to client 110 by network server 160. At some point after sending the contact viewing information, network server 160 may receive synchronization parameters from the client device at step 520. The synchronization parameters may indicate whether to synchronize with a selected contact, whether a particular contact may synchronize with a user, and the actions that the user has allowed to be applied to content playback in order to synchronize the playback with other contacts.

After receiving the synchronization parameters, a determination is made as to whether the user has selected to synchronize playback of the content with one or more contacts at step 525. The user selection is indicated within the information received by network server 160 by client 110. If the user has elected to not synchronize viewing with the contacts, the method of FIG. 5 continues to step 545. If the user has selected to synchronize playback of the content with one or more contacts, a determination is made as to whether a viewing group for the selected content synchronization already exists at step 530. A viewing group is managed by synchronization server 170 for each group of contacts playing a particular content element. If there is not currently a viewing group for synchronized viewing of the content requested by the user, a new viewing group is created for the content viewed by the user and at least one contact at step 535 and the method continues to step 550. If a viewing group does exist, the user is added to the existing viewing group for the selected content. The method of FIG. 5 then continues to step 550 where the playback synchronization parameters for the user are stored. The parameters may be stored locally on server 160, remotely to user data store 150 and/or some other location.

Figure 6:
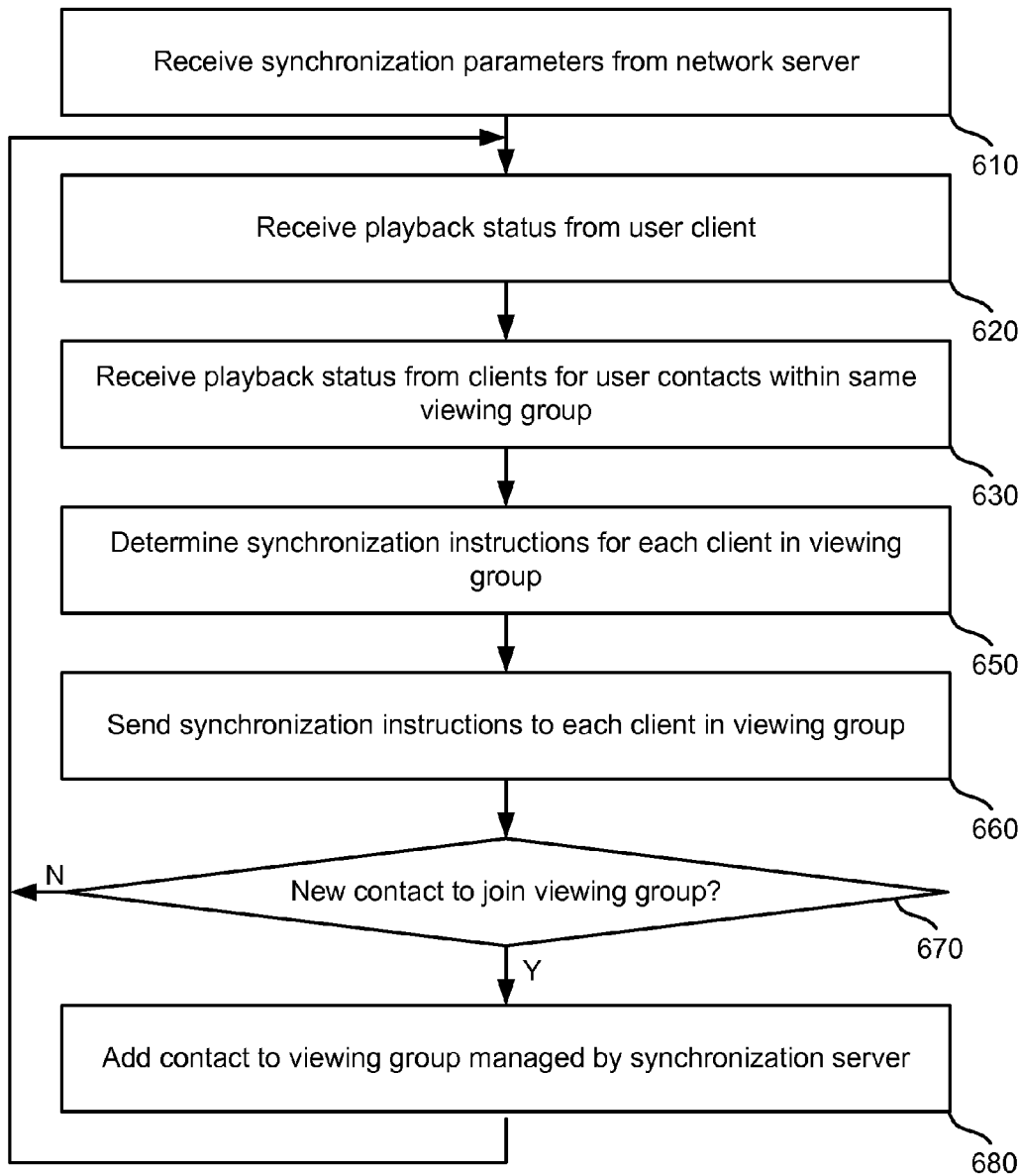
FIG. 6 is a flowchart of an embodiment of a method for managing playback synchronization by a synchronization server.

As discussed above, FIGS. 6-7 illustrate operation of synchronization server 170 during synchronization of content playback by two or more client devices. FIG. 6 is a flowchart of an embodiment of a method for managing playback synchronization by synchronization server 170.

First, synchronization parameters are received from network server 160 by synchronization server 170 at step 610. The synchronization parameters indicate whether a user has selected content playback speed may be increased or decreased, whether commercials may be skipped, whether a playback may proceed with highlights only, and other content playback preferences. Playback status is then received from a client device at step 620. In some embodiments, the status is received as a message sent from client 110, such as a SOAP message, to synchronization server 170 and includes a user identification, content identification, current playback position and current time at which the position is played by a client device. The current time may be the current atomic time or some other synchronized time between client devices 110-130. In addition to receiving playback status from a client, synchronization server 170 receives playback status from the other clients associated with user contacts within the same viewing group at step 630. Playback status for other clients may be received before or after playback status received from the user client at step 620 and will include the same status elements as those discussed with respect to step 620.

After receiving a playback status for each user in a viewing group, synchronization instructions are then determined for each client device in the viewing group at step 650. Synchronization instructions may be determined based on the difference between playback positions for each client device and the synchronization preferences for each device as indicated by the user or contact. Determining synchronization instructions for each client in a viewing group is discussed in more detail below with respect to FIG. 7.

The generated synchronization instructions are sent to each client in a viewing group at step 660. In some embodiments, instructions may indicate that a client device should increase the speed of playback, decrease the speed of playback, delete commercials during playback, playback only highlights of a particular content, playback the content at normal speed without modification, or some other instruction. A determination is then made by synchronization server 170 as to whether a new contact should be joined to the viewing group at step 670. In some embodiments, a new user can join a viewing group if the user is a contact of a current member of the group and the contact would like to synchronize playback of the content currently viewed by that viewing group. In some embodiments, other and/or additional criteria may be used to add a contact to a viewing group. If no contact is to join a viewing group, the method of FIG. 6 returns to step 620. If a new contact will join the viewing group, the contact is added to the viewing group at step 680 and the method of FIG. 6 returns to step 620.

Figure 7:
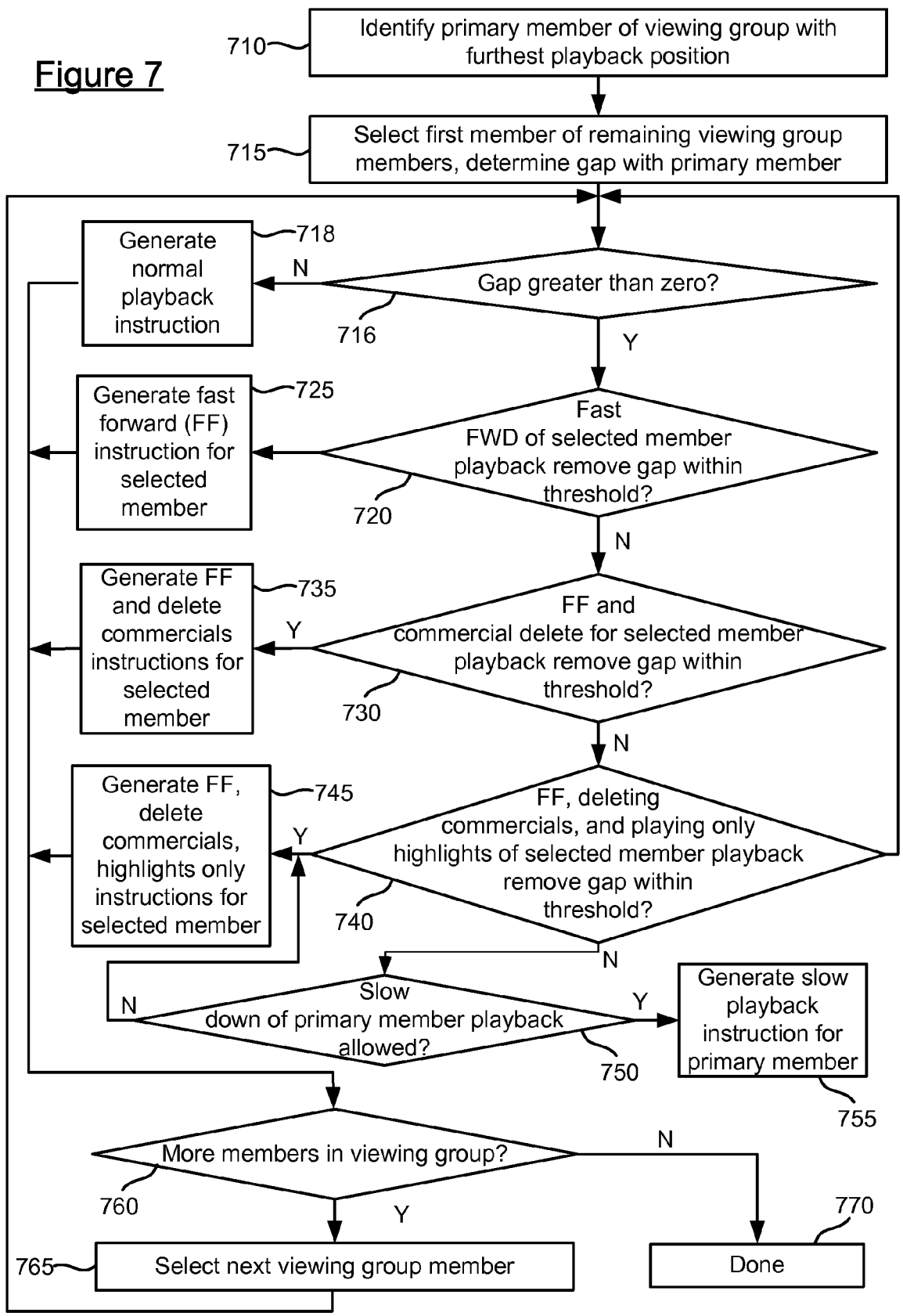
FIG. 7 is a flowchart of an embodiment of a method for determining synchronization instructions by a synchronization server.

FIG. 7 is a flowchart of an embodiment of a method for determining synchronization instructions by synchronization server 170. In some embodiments, the method of FIG. 7 provides more detail for step 650 of the method of FIG. 6. First, a primary member of a viewing group is identified as the client device experiencing the furthest or most advanced playback position of all synchronizing clients in a viewing group at step 710. For example, if a first user is at a playback position of 7:21:06 and a second user is at playback position of 6:58:08, the first user is selected as a primary member because the first user's playback position is nearly 23 minutes further into the content than the second user.

If a member added to the group has the furthest playback status of the group members, the new member may be selected as the primary member at step 710. In some embodiments, the primary member of a group is updated continuously as content playback updates are received for the group.

A first member of the remaining viewing group members is selected and a gap is determined between that user's playback position and the primary member's playback position at step 715. The first member selected may be any member other than the primary member.

A determination is made at step 716 as to whether the gap is greater than zero seconds. If the gap is greater than zero seconds, the method continues to step 720 to determine what instructions may be generated to synchronize playback between the two clients. If there is no gap (the gap is zero seconds), an instruction to playback content at normal speed is generated for the selected member at step 718 and the method continues to step 760.

Once it is determined that a gap exists for the currently selected member, the synchronization server determines whether any of several actions may be taken to synchronize the selected member playback position with the primary member playback position. Determinations for selecting whether or not to enable a synchronization action are based on whether the action eliminates the gap between the selected user and the primary user within a threshold time period. A threshold time period may be implemented as any period of time, such as five minutes, ten minutes, fifteen minutes, half of a remaining time in the playback content for the primary user, or some other time period. For example, if an action brings a selected member to the same playback position as the primary member within a threshold of five minutes, then a particular action may be taken. Moreover, if the selected action removes a gap between the selected member and the primary member before the next set of commercials, the action may be taken.

A determination is made as to whether increasing the playback speed (fast forwarding playback) of the selected member's playback removes the gap within a threshold at step 720. The determination involves whether increasing the selected member's playback of the content by a certain ratio causes the selected client device playback position to catch the primary contact playback position. Increasing the playback speed at a client device may be done by a ratio of 1:1, 1:2, 1:25, or some other ratio. If increasing the playback speed would remove a gap within a particular threshold, a speed increase instruction is generated for the selected member at step 725 and the method of FIG. 7 continues to step 760.

If increasing the speed of the selected member's playback would not remove the gap with the primary member within the threshold, a determination is made as to whether increasing a playback speed (fast forwarding) and deleting commercials for the selected member's playback would remove the gap with the primary member within a threshold at step 730. A client device content playback may be controlled to automatically skip commercials during playback. If increasing playback (fast forwarding playback) and deleting commercials for the selected member removes the gap in playback position with respect to the primary member within a threshold, then an instruction to increase playback speed and an instruction to delete commercials are generated for the selected member at step 735 and the method of FIG. 7 continues to step 760.

If playback speed increase and commercial deletion together do not remove the gap, a determination is made as to whether playback speed increase, commercial deleting, and playing only highlights of a selected member playback may remove a gap with respect to the primary member within a threshold at step 740. Playing only content highlights may increase the fast-forward playback speed during a period of the content not associated with the highlight or delete the non-highlight content. For example, highlights of content associated with a sports video include content that depicts scoring, a period of time just before a commercial (such as one minute), and other content. If speed increase, deleting commercials, and playing only highlights do not remove the gap within a threshold, a determination is made at step 750 as to whether the primary member playback may be decreased at step 750. If the primary member has indicated that his or her content playback speed may be reduced to synchronize content, a slow playback instruction is generated for the primary member at step 755 and the method of FIG. 7 returns to step 720. If the primary member's content playback may not be reduced, the method of FIG. 7 proceeds to step 745. If at step 740 the playback increase, commercial deletes, and highlight only playback does not remove the gap, the method of FIG. 7 continues to step 745 where the fast-forward instruction, delete commercial instruction and highlights only instructions are generated for the selected member and the method of FIG. 7 continues to step 760. Steps 720-745 illustrate examples of one or more instructions that can be used to synchronize content. These are intended as examples only and other instructions and instruction combinations can be used.

A determination is made as to whether more members exist in the viewing group at step 760. If no additional members exist in the viewing group, the method of FIG. 7 is complete at step 770. If more members do exist in the viewing group, the next viewing group member is selected at step 765 and the method of FIG. 7 returns to step 720.

Figure 8:
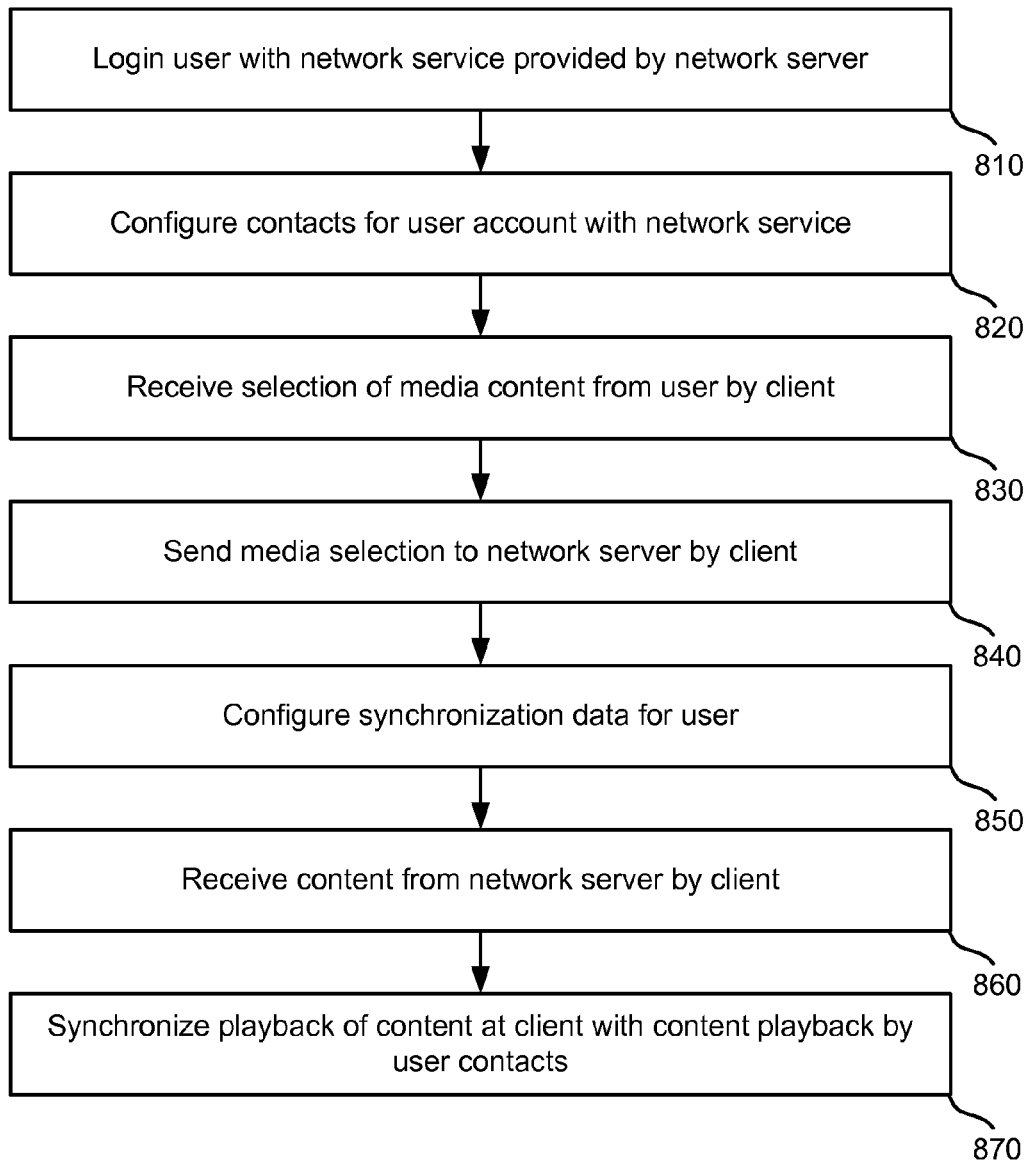
FIG. 8 is a flowchart of an embodiment of a method for synchronizing content playback by a client.
Figure 9:
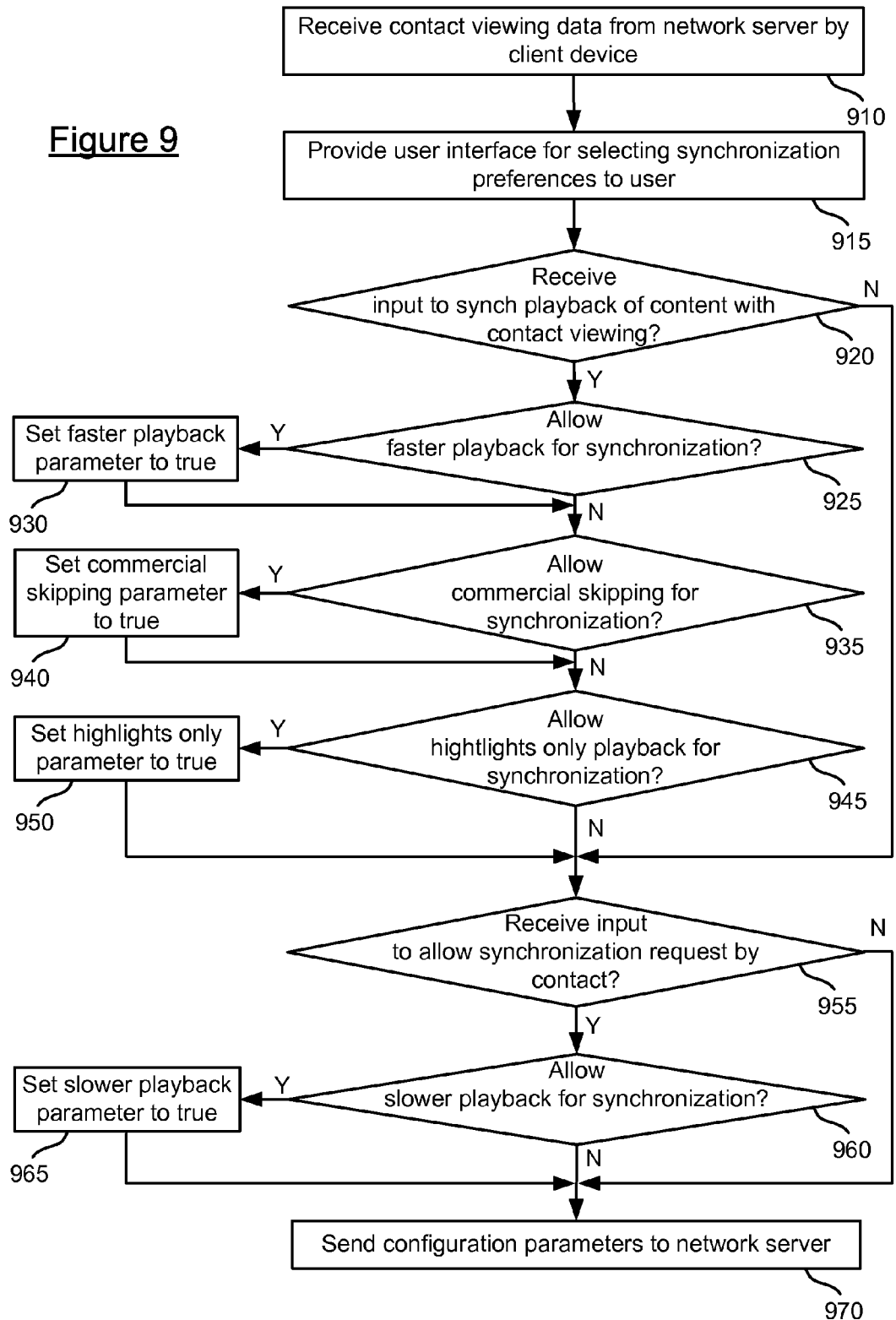
FIG. 9 is a flowchart of an embodiment of a method for configuring synchronization data for a user by a client.
Figure 10:
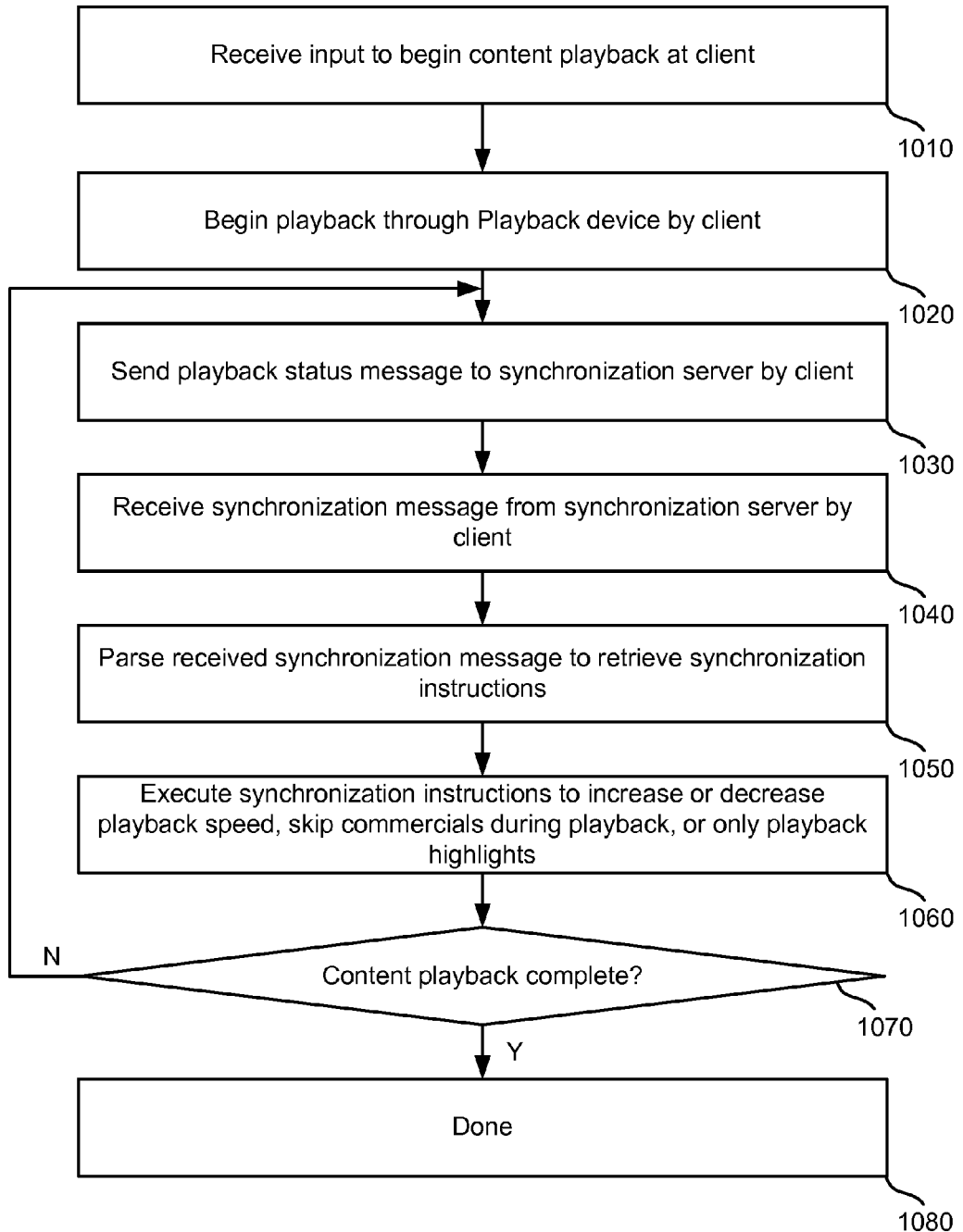
FIG. 10 is a flowchart of an embodiment of a method for playing content at a client device.

FIGS. 8-10 describe operation of a client device while synchronizing playback of content between two or more users. FIGS. 8-10 will be discussed with reference to client device 110, but can be implemented for any client device. FIG. 8 is a flowchart of an embodiment of a method for synchronizing content playback by a client. First, a user is logged in to a network service provided by network server at step 810. User login to a network service by client device 110 may include providing a user interface received from a server through playback device 115, receiving a user name and password login information from a user, sending login information to network server 170 and receiving a confirmation of login from the server.

Contacts may then be configured for the user account with a network service provided by a network server 160 at step 820. Configuring contacts by client device 120 may include receiving input from a user through a user interface for configuring contact data and sending the received contact data to network server 160. Network server 160 may then store the contact data within a user account record 155 within user data store 150.

A selection is received of media content from a user by a client device at step 830. The media content selection may be received through a user interface provided to a client device by network server 160. The selected media may be a video, audio or some other element of digital media that a user wishes to playback on client device 110. The media selection is then sent to network server 160 by a client device at step 840. After sending the media selection to a network server, synchronization data for a user may be configured by the client device at step 850. Configuring synchronization data may be done through a user interface received from network server 160 to select the synchronization preferences for the user. The preferences may then be used to generate synchronization parameters and are sent to network server 160. Configuring synchronization data for a user is discussed in more detail below with respect to FIG. 9.

Content is received from network server 160 by client device 110 at step 860. The received content is that requested by the user at step 830. In addition to the content, the client device may also receive one or more instructions for synchronizing playback. After receiving the content, playback of the content is synchronized at the client device with content playback by one or more user contacts at step 870. Synchronization may be performed based on playback status messages and synchronization instructions exchanged between client 110 and synchronization server 170. Synchronizing playback of the content at a client device is discussed in more detail below with respect to FIG. 10.

FIG. 9 is a flowchart of an embodiment of a method for configuring synchronization data for a user by a client. In some embodiments, the method of FIG. 9 provides more detail for step 850 of the method of FIG. 8. First, contact viewing data is received from network server 160 by client device 110 at step 910. The contact viewing data may include contacts currently viewing the content selected by the user. A user interface is then provided for selecting synchronization preferences at step 915. The user interface is provided through playback device 115 in communication with client device 110. Steps 920-955 relate to receiving input through the user interface provided at step 915.

A determination is made as to whether input is received through the user interface to synchronize user playback of the content with playback of the content by a contact at step 920. If no input is received from a user by client device 110 to synchronize the playback of content with content playback by a user's contact, the method of FIG. 9 continues to step 955. If client device 110 does receive input to synchronize playback, client device 110 determines whether input is received to allow faster playback for synchronization at step 925. A user may simply indicate that faster playback is allowed or may select a speed up to which faster playback may be allowed, such as 1.15, 1.2, 1.3 times faster, or some other multiple of a normal playback speed. If input has been received to allow faster playback for synchronization, a faster playback parameter is set to true by client device 110 and the method of FIG. 9 continues to step 935. If faster playback is not allowed for synchronization, the method of FIG. 9 continues to step 935.

A determination is made as to whether a user has indicated that skipping commercials is allowed during synchronization at step 935. If the user has indicated through input received through a user interface that skipping commercials is not allowed to synchronize content, the method of FIG. 9 continues to step 945. If the user indicated that deleting commercials during playback is allowed, a commercial skipping parameter is set to true at step 940 and the method of FIG. 9 continues to step 945.

A determination is made as to whether a user has indicated that viewing highlights only during playback may be allowed to synchronize playback at step 945. If a user has not indicated that showing highlights only is not allowed, the method of FIG. 9 continues to step 955. If the user has indicated that it would be allowed to show only highlights to synchronize, a highlights only parameter is set to true at step 950 and the method of FIG. 9 continues to step 955.

A determination is made as to whether input has been received to allow synchronization requests by other contacts at step 955. If the user has indicated that no synchronization requests should be considered by other contacts, the method of FIG. 9 ends at step 970 with the set configuration parameters sent to network server 160 by client device 110. If a user has indicated that synchronization requests by other contacts are allowed, a determination is made as to whether a slower playback speed may be allowed for the user's content playback at step 960. If slower playback is not allowed, configuration parameters already set are sent to network server 160 at step 970. If slower playback is allowed, a slower playback parameter is set to true at step 965 and all user synchronization parameters are sent to network server 160 at step 970.

FIG. 10 is a flowchart of an embodiment of a method for playing content at a client device. In some embodiments, the method of FIG. 10 provides more detail for step 870 of the method of FIG. 8. First, input is received to begin content playback by client 110 at step 1010. Playback then begins through Playback device 115 associated with client device 110 at step 1020. A playback status message is then sent to synchronization server 170 by client device 110 at step 1030. The playback status message may include a user identification, content identification, playback position and current time. The current time may be determined by accessing an atomic clock signal over the Internet or other network.

A synchronization message is then received from synchronization server 170 by client device 110 at step 1040. The received synchronization message is parsed to retrieve synchronization instructions at step 1050. The synchronization instructions may include playback speed increase instructions, speed decrease instructions, commercial deletion instructions, play highlight only instructions, or other instructions. The instructions should conform to the preferences set by the user during the method of FIG. 9. The retrieved synchronization instructions are executed at step 1060. As a result of executing the synchronization instructions, playback of the content at client device 110 may be increased, decreased, configured to skip playback of commercials during playback, only playback highlights, or manipulated in some other way to synchronize, if needed, with one or more user contacts who are also playing the content.

A determination is made as to whether playback of the content is complete at step 1070. If the content playback has completed, then the method of FIG. 10 is done at step 1080. If content playback is not complete, then the method of FIG. 10 returns to step 1030.

Figure 11:
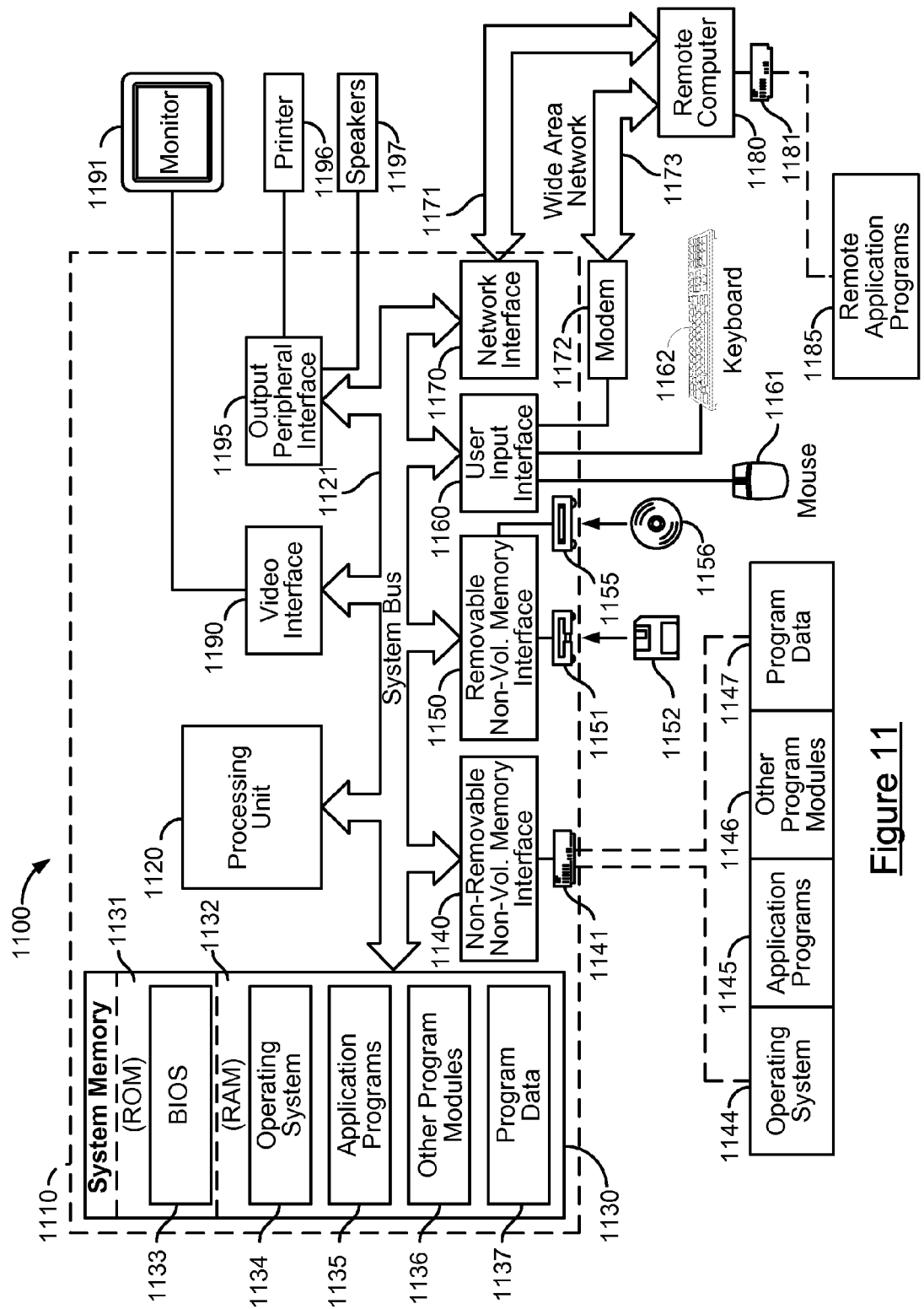
FIG. 11 is a block diagram of an embodiment of a computing environment for implementing the present technology.
Figure 12:
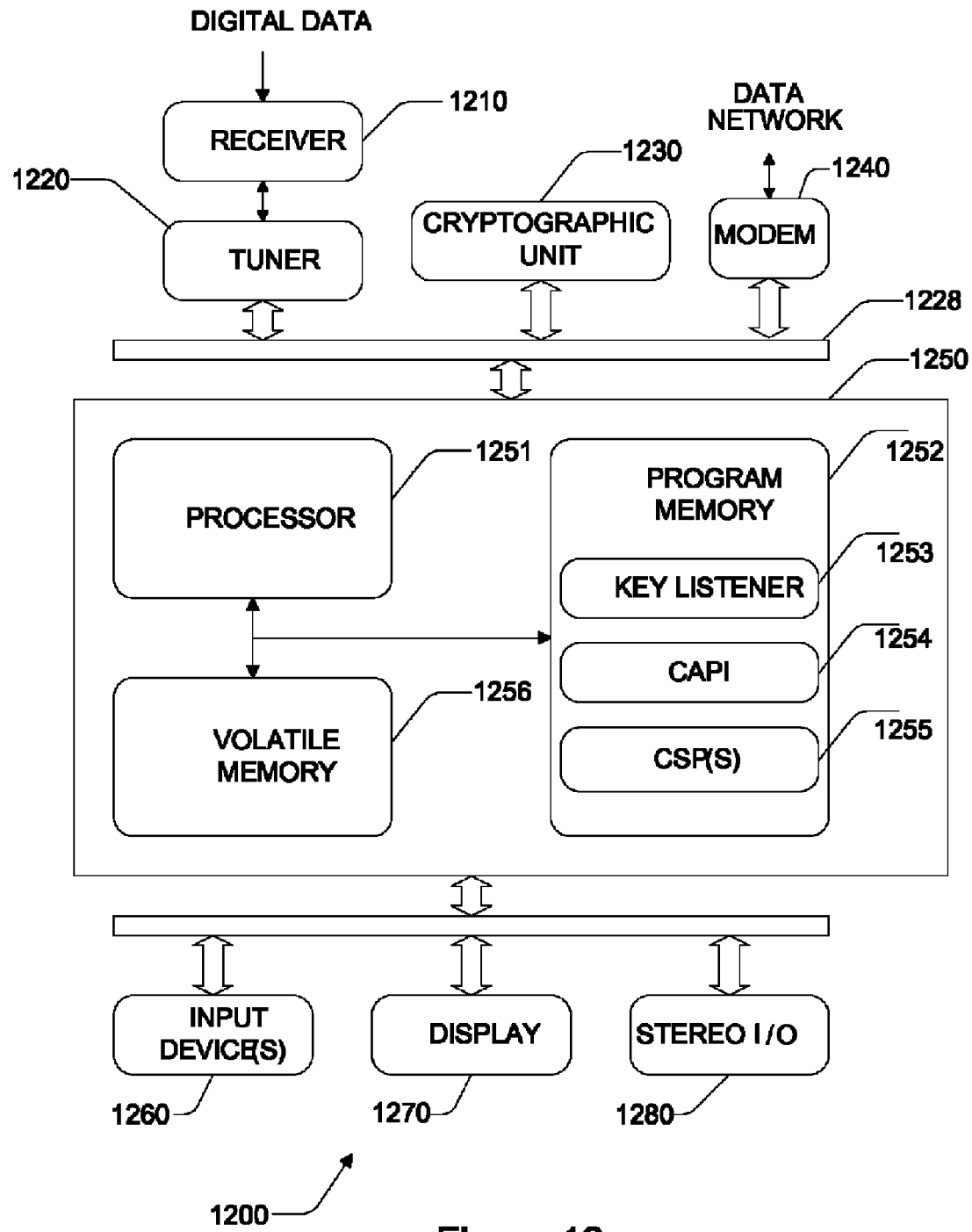
FIG. 12 is a block diagram of an embodiment of a broadcast-enabled electronic media device that may serve as a platform.

FIG. 11 is an embodiment of a computing environment for implementing the present technology. The computing environment of FIG. 11 may be used to implement Playback devices 115-135, client devices 110-130, user data store 150, network server 160, synchronization server 170 and content sources 182-186.

Computing environment 1100 of FIG. 11 is only one example of a suitable computing environment and is not intended to suggest any limitation as to the scope of use or functionality of the technology herein. Neither should the computing environment 1100 be interpreted as having any dependency or requirement relating to any one or combination of components illustrated in the exemplary operating environment 1100.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the technology herein includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1140 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1190.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

At least some of the embodiments disclosed herein may be implemented on a media device that a user interacts with when viewing media content. FIG. 1C shows an example configuration of a broadcast-enabled electronic media device 1200 having user input device(s) 1260 allowing user interaction with media content. In one embodiment, the device 1200 may be used to implement client devices 110-130. Device 1200 includes a central processing unit 1250 having a processor 1251, volatile memory 1256 (e.g., RAM), and program memory 1252 (e.g., ROM, Flash, disk drive, floppy disk drive, CD-ROM, etc.). The device 1200 has one or more input devices 1260 (e.g., keyboard, mouse, etc.), a video display 1270 (e.g., VGA, SVGA), and a stereo I/O 1280 for interfacing with a stereo system.

The device 1200 includes a digital broadcast receiver 1210 (e.g., satellite dish receiver, RF receiver, microwave receiver, multicast listener, etc.) and a tuner 1220 which tunes to appropriate frequencies or addresses of the broadcast network. The tuner 1220 is configured to receive digital broadcast data in a particularized format, such as MPEG-encoded digital video and audio data, as well as digital data in many different forms, including software programs and programming information in the form of data files. The device 1200 also has a modem 1240 which provides dial-up access to the data network 1228 to provide a back channel or direct link to the server 1250. In other implementations of a back channel, the modem 1240 might be replaced by a network card, or an RF receiver, or other type of port/receiver which provides access to the back channel.

The device 1200 runs an operating system which supports multiple applications. The operating system may be a multi-tasking operating system which allows simultaneous execution of multiple applications. The operating system may employ a graphical user interface windowing environment which presents the applications or documents in specially delineated areas of the display screen called "windows."

The device is illustrated with a key listener 1253 to receive the authorization and session keys transmitted from the server 1250. The keys received by listener 1253 are used by the cryptographic security services implemented at the device 1200 to enable decryption of the session keys and data. Cryptographic services are implemented through a combination of hardware and software. A secure, tamper-resistant hardware unit 1282 is provided external to the CPU 1260 and two software layers 1254, 1255 executing on the processor 1251 are used to facilitate access to the resources on the cryptographic hardware 1230.

The software layers include a cryptographic application program interface (CAPI) 1284 which provides functionality to any application seeking cryptographic services (e.g., encryption, decryption, signing, or verification). One or more cryptographic service providers (CSPs) implement the functionality presented by the CAPI to the application. The CAPI layer 1254 selects the appropriate CSP for performing the requested cryptographic function. The CSPs 1255 perform various cryptographic functions such as encryption key management, encryption/decryption services, hashing routines, digital signing, and authentication tasks in conjunction with the cryptographic unit 1282. A different CSP might be configured to handle specific functions, such as encryption, decryption, signing, etc., although a single CSP can be implemented to handle them all. The CSPs 1255 can be implemented as dynamic linked libraries (DLLs) that are loaded on demand by the CAPI, and which can then be called by an application through the CAPI 1254.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for synchronizing playback of content, comprising:
   receiving a request for a first digital content from a first client device associated with a user;
   retrieving the first digital content from a content source;
   retrieving content viewing information for one or more contacts associated with the user, the one or more contacts viewing digital content at one or more additional client devices;
   determining from the content viewing information if digital content being viewed by the one or more contacts matches the first digital content requested by the user, and if so:
   providing playback information to the first client device for each contact viewing the first digital content;
   receiving user synchronization parameters from the first client device with respect to each additional client device corresponding to the one or more contacts viewing the first digital content;
   receiving a selection from the first client device of one or more contacts with which to synchronize playback of the first digital content;
   grouping the user and the selected one or more contacts into a viewing group associated with the first digital content;
   generating synchronization instructions for the first client, generating synchronization instructions for the first client including:
      identifying a primary member in the viewing group having the furthest playback position with respect to the first digital content;
      determining a difference between a playback position associated with the user and the playback position associated with the primary member; and
      responsive to said determining said difference in playback position between the user and the primary member, determining an action based on an amount of time that it takes for the action to synchronize the difference in playback position and a threshold value;
   providing the requested first digital content and synchronization instructions to the user at the first client, the synchronization instructions specifying one or more user approved actions to be performed during playback of the requested first digital content; and
   automatically synchronizing playback of the requested first digital content at the first client and at additional clients associated with the selected one or more contacts by executing the synchronous instructions in accord with the user synchronization parameters.

2. The method of claim 1, wherein the content is provided to a user as streamed video content.

3. The method of claim 1, wherein said step of generating synchronization instructions further includes:
   automatically generating an instruction to increase playback speed of the content.

4. The method of claim 1, wherein said step of generating synchronization instructions further includes:
   automatically generating an instruction to decrease playback speed of the content.

5. The method of claim 1, wherein said step of generating synchronization instructions further includes:
   automatically generating an instruction to not playback commercials within the content.

6. The method of claim 1, wherein said step of generating synchronization instructions further includes:
   automatically generating an instruction to only playback highlights of the content.

7. The method of claim 1, wherein the synchronization instructions are automatically generated based on a difference in playback position and the user synchronization parameters.

8. One or more processor readable storage devices having processor readable code embodied on said processor readable storage devices, said processor readable code for programming one or more processors to perform a method comprising:
   receiving a selection from a user for content to be provided through an interface;
   providing a list of user contacts currently playing the selected content, the list provided in response to the received content selection;
   receiving user synchronization parameters from the user with respect to each user contact currently playing the selected content;
   receiving a selection of one or more of the user contacts currently playing the selected content;
   providing the selected content to the user through an interface;
   determining a difference between a playback position associated with the user and a playback position associated with a selected user contact having the furthest playback position with respect to the selected content;
   generating instructions for the user responsive to said determining said difference in the playback position between the user and the selected user contact, generating instructions for the user including determining an action to be executed based on an amount of time that it takes for the action to synchronize said difference in the playback position;
   receiving the instructions from a server to manipulate content playback to the user and/or the selected user contacts in accord with the user synchronization parameters, the instruction specifying one or more user approved actions to be performed during playback of the selected content; and
   executing the instructions to manipulate content playback.

9. The one or more processor readable storage devices of claim 8, the method further comprising:
   sending the selected one or more user contacts to a network server; and
   receiving the content selected by the user from the network server in response to the sending the selected one or more contacts to the network server.

10. The one or more processor readable storage devices of claim 9, wherein the content is received as a stream of video data.

11. The one or more processor readable storage devices of claim 10, further comprising:
   providing a playback update to a synchronization server during playback of the content, the playback update identifying the current time, the playback position, and the user associated with the playback.

12. The one or more processor readable storage devices of claim 11, wherein said step of receiving instructions includes:

receiving an instruction associated with playback speed increase, playback speed decrease, skipping commercials, or only playing content highlights.

13. A system for providing synchronized content, comprising:
- a communication interface for communicating with a network server and a display device;
- a storage device;
- one or more processors that retrieve content from a server in response to user input, configure synchronization parameters for a user in accord with playback information for one or more other users who are currently viewing the content, receive synchronization instructions from a remote server which specifies user approved actions to be performed during playback of the retrieved content and complies with the synchronization parameters, and perform playback of the retrieved content by transmitting content playback data to the display device while manipulating the playback based on execution of the synchronization instructions;
- said synchronization instructions are generated by said remote server, said remote server determines a difference between a playback position associated with the user and a playback position associated with one of the other users having the furthest playback position with respect to the retrieved content, said remote server determines an action to be perform based on an amount of time that it takes for the action to synchronize said difference in the playback position in response to said determining said difference in the playback position between the user and the one other user contact.

14. The system of claim 13, wherein the content is retrieved as streaming digital video content.

15. The system of claim 13, wherein the system is a video gaming console.

* * * * *